(12) United States Patent
Sirohey et al.

(10) Patent No.: US 8,160,395 B2
(45) Date of Patent: Apr. 17, 2012

(54) METHOD AND APPARATUS FOR SYNCHRONIZING CORRESPONDING LANDMARKS AMONG A PLURALITY OF IMAGES

(75) Inventors: Saad Ahmed Sirohey, Pewaukee, WI (US); Renaud Capolunghi, Vanves (FR); Gopal B. Avinash, New Berlin, WI (US); Laurent Launay, St Remy les Chevreuse (FR); Jérôme François Knoplioch, Neuilly sur Seine (FR)

(73) Assignee: General Electric Company, Schenectady, NY (US)

( * ) Notice: Subject to any disclaimer, the term of this patent is extended or adjusted under 35 U.S.C. 154(b) by 926 days.

(21) Appl. No.: 11/603,718

(22) Filed: Nov. 22, 2006

(65) Prior Publication Data
US 2008/0118111 A1 May 22, 2008

(51) Int. Cl.
*G06K 9/32* (2006.01)
*G06K 9/00* (2006.01)
*G06K 9/18* (2006.01)
*G06K 9/62* (2006.01)

(52) U.S. Cl. ......... 382/294; 382/131; 382/184; 382/209
(58) Field of Classification Search .................. 382/131, 382/184, 209, 294; 250/455
See application file for complete search history.

(56) References Cited

U.S. PATENT DOCUMENTS

| | | |
|---|---|---|
| 4,577,152 A | 3/1986 | Macovski |
| 5,128,864 A | 7/1992 | Waggener et al. |
| 5,307,264 A | 4/1994 | Waggener et al. |
| 5,430,783 A | 7/1995 | Hu et al. |
| 5,647,018 A | 7/1997 | Benjamin |
| 5,673,300 A | 9/1997 | Reckwerdt et al. |
| 5,694,530 A | 12/1997 | Goto |
| 5,720,291 A | 2/1998 | Schwartz |
| 5,740,222 A | 4/1998 | Fujita et al. |
| 5,900,878 A | 5/1999 | Goto et al. |
| 5,920,660 A | 7/1999 | Goto |
| 6,016,150 A * | 1/2000 | Lengyel et al. ............... 345/426 |

(Continued)

FOREIGN PATENT DOCUMENTS

JP 9156689 A 6/1997

(Continued)

OTHER PUBLICATIONS

Philippe G. Lacroute, Fast Volume Rendering Using a Shear-Warp Factorization of the Viewing Transformation, Technical Report: CSL-TR-95-678; Stanford Center for integrated Systems, ARPA/ONR Contracts N00039-91-C-0138, 175-6212-1, NCFContract CCR-9157767; 236 pgs, Sep. 1995.

(Continued)

*Primary Examiner* — Randolph I Chu
(74) *Attorney, Agent, or Firm* — The Small Patent Law Group; Dean D. Small

(57) ABSTRACT

A method is provided for synchronizing corresponding landmarks among a plurality of images of an elastic object. The method includes identifying a plurality of landmarks in a first image of the object and a second image of the object, determining a correspondence between the landmarks in the first image and the landmarks in the second image, determining a distance transformation between a pair of adjacent landmarks in the first image and the corresponding pair of adjacent landmarks in the second image, and when displaying the first and second images, using the distance transformation to smoothly navigate between the adjacent landmarks such that corresponding landmarks of the first and second images are arrived at about simultaneously during navigation.

16 Claims, 4 Drawing Sheets

U.S. PATENT DOCUMENTS

| | | | |
|---|---|---|---|
| 6,331,116 B1 | 12/2001 | Kaufman et al. | |
| 6,477,401 B1 | 11/2002 | Johnson et al. | |
| 6,603,494 B1 | 8/2003 | Banks et al. | |
| 6,925,200 B2 | 8/2005 | Wood et al. | |
| 6,947,784 B2 | 9/2005 | Zalis | |
| 6,990,231 B2 | 1/2006 | Goto | |
| 7,027,630 B2 | 4/2006 | Bruijns | |
| 7,072,501 B2 | 7/2006 | Wood et al. | |
| 7,123,760 B2 | 10/2006 | Mullick et al. | |
| 7,518,619 B2* | 4/2009 | Stoval et al. | 345/619 |
| 2003/0054327 A1* | 3/2003 | Evensen | 434/252 |
| 2003/0185426 A1* | 10/2003 | Ohishi | 382/128 |
| 2004/0066958 A1 | 4/2004 | Chen et al. | |
| 2004/0101183 A1 | 5/2004 | Mullick et al. | |
| 2004/0249270 A1 | 12/2004 | Kondo et al. | |
| 2005/0094858 A1* | 5/2005 | Sirohey et al. | 382/131 |
| 2005/0147297 A1 | 7/2005 | McLaughlin et al. | |
| 2005/0259854 A1 | 11/2005 | Arimura et al. | |
| 2006/0074285 A1 | 4/2006 | Zarkh et al. | |
| 2006/0079743 A1 | 4/2006 | Ferrant et al. | |
| 2006/0079761 A1 | 4/2006 | Tu et al. | |
| 2006/0094961 A1 | 5/2006 | Mikheev et al. | |
| 2006/0215896 A1 | 9/2006 | Sirohey et al. | |
| 2006/0239118 A1* | 10/2006 | Guidry et al. | 367/68 |
| 2006/0241427 A1 | 10/2006 | Kinouchi et al. | |
| 2007/0019846 A1 | 1/2007 | Bullitt et al. | |
| 2007/0019850 A1 | 1/2007 | Knoplioch et al. | |
| 2007/0127791 A1* | 6/2007 | Ernvik et al. | 382/128 |
| 2007/0127803 A1 | 6/2007 | Yoshida et al. | |
| 2007/0127804 A1 | 6/2007 | Yoshida et al. | |
| 2007/0165928 A1 | 7/2007 | Yoshida et al. | |
| 2009/0279752 A1 | 11/2009 | Sirohey et al. | |
| 2011/0080496 A1* | 4/2011 | Givon | 348/222.1 |

FOREIGN PATENT DOCUMENTS

| | | | |
|---|---|---|---|
| JP | 8267292 A | 10/1997 | |
| WO | WO-03/452222 A2 | 6/2003 | |
| WO | WO 2005/023086 A2 | 3/2005 | |

OTHER PUBLICATIONS

Pascal Volino, et al., Efficient Self-Collision Detection on Smoothly Discretized Surface Animations Using Geometrical Shape Regularity, MIRALab Copyright © Information 1998; MIRALab, University of Geneva, (18) pgs.

Zigang Wang, et al., An Improved Electronic Colon Cleansing Method for Detection of Polyps by Virtual Colonoscopy, Proceedings of the 2005 IEEE Engineering in Medicine and Biology 27th Annual Conference, Shanghai, China, Sep. 1-4, 2005, pp. 6512-6515.

Franaszek, et al., Hybrid Segmentation of Colon Filled With Air and Opacified Fluid for CT Colonoscopy, IEEE Transactions on Medical Imaging, vol. 25, No. 3, Mar. 2006, pp. 358-368.

Zigang Wang, et al., An Improved Electronic Colon Cleansing Method for Detection of Polyps by Virtual Colonoscopy, IEEE Transactions on Biomedical Engineering, vol. 53, No. 8, Aug. 2006. pp. 1635-1646.

Nicholas Ayache, Computer Vision, Virtual Reality and Robotics in Medicine, First International Conference, CVRMed '95, Nice, France, Apr. 1995, Proceedings, (10) pgs.

Frederik Maes, et al., Computer-Aided Interactive Object Delineation Using an Intelligent Paintbrush Technique, Lecture Notes in Computer Science, First International Conference, CVRMed '95, Nice, France, Apr. 1995 Proceedings, pp. 77-83.

Jed Lengyel, et al., Lecture Notes in Computer Science, Three-Dimensional Reconstruction and Volume Rendering of Intravascular Ultrasound Slices Imaged on a Curved Arterial Path, First International Conference, CVRMed '95, Nice, France, Apr. 1995 Proceedings, pp. 399-405.

Robert A. Drebin, et al., Volume Rendering, Computer Graphics, vol. 22, No. 4, Aug. 1988, (10) pgs.

Zuiderveld, et al., Multi-Modal Volume Visualization Using Object-Oriented Methods, 1995, IEEE, pp. 59-66 and 129.

Viergever, et al., Integrated Presentation of Multimodal Brain Images, Brain Topography, vol. 5, No. 2, 1992, pp. 135-145.

Markus Hadwiger, et al., High-Quality Two-Level Volume Rendering of Segmented Data Sets on Consumer Graphics Hardware, VRVis Research Center Austria, (8) pages, 2003.

Jean-Jose Jacq, et al., A Direct Multi-Volume Rendering Method. Application to Visual Assessment of 3-D Image Registration Algorithms, Department image et Traitement de l'Information, Telecom Bretagne, B.P 832-29285 Brest Cedex—France, (10) pgs., 1996.

Paul J. Keller, et al., MR Angiography With Two-Dimensional Acquisition and Three-Dimensional Display, Radiology 1989; 173: 527-532.

Tracy L. Faber, et al., Three-Dimensional Fusion of Coronary Arteries With Myocardial Perfusion Distributions: Clinical Validation, The Journal of Nuclear Medicine, vol. 45, No. 5, May 2004, pp. 745-753.

Hirai et al., Intracranial Aneurysms at MR Angiography: Effect of Computer-aided diag on Radiologists Det. Perf., Radiology 2005; 237:605-610, RSNA 2005.

Doi, Current status and future potential of computer-aided diagnosis in medical imaging, British Journal of Radiology (2005) 78, S3-s19.

Cai et al., Special session on colon liver and Brain CAD, Int J CARS (2006) 1:369-388.

Hisanori et al., Development of cerebral aneurysm computer-aided detection systems with 3D mra data, Yokogawa Technical Report English Edition, No. 39 (2005).

Kobashi et al., Computer-aided diagnosis of intracranial aneurysms in MRA images with case-based reasoning, IEICE Transactions on Information and Systems 2006 E89-D(1):340-350.

Ninomiya et al., Feature Extraction from MRA Images for Fuzzy Rule-based Diagnosis of Cerebral Aneurysms, http://scholar.google.com/scholar?hl=en&lr=&q=cache:zcJ5_ZuD34oJ:wwwj3.comp.eng.himeji-tech.as.jp/staff/kobashi/reprints/SCIS2002-ninomiya.pdf.

Ando et al., Computer-aided diagnosis scheme for detection of unruptured intracranial aneurysms in MR angiography, Eng in Med and Bio Society, 2005; IEEE-EMBS 20.

Saad Sirohey; "Lung VCAR"; General Electric Company; 6 pages, 2005.

Lichan Hong; "Virtual voyage; Interactive Navigation in the Human Colon"; Center for visual Computing State university of New york at Stony Brook; 8 pages, 1997.

Laurent Saroul, et al.; "Distance Preserving Flattening of Surface Sections", IEEE Transactions on visulaization and computer Graphics, vol. 12, No. 1, Jan.-Feb. 2006, 10 pgs.

Sonka and J Michael Fitzpatrick et al., Handbook of Medical Imaging, vol. 2, Medical Image Processing and Analysis, Jan. 1, 2000, pp. 711-810, 898-914.

Foreign Search Report, Netherlands Application No. 1034671, Dated Oct. 20, 2008 (15 pages).

Yoshida, H. and Nappi, J., "*Three-Dimensional Computer-Aided Diagnosis Scheme for Detection of Colonic Polyps*", IEEE Trans. Medical Imaging, vol. 20, No. 12, pp. 1261-1274, 2001.

Dorai, C. and Jain, A.K., "*COSMOS-A Representation Scheme for 3D Free-Form Objects*", IEEE Trans. Pattern Analysis and Machine Intelligence, vol. 19, No. 10, pp. 1115-1130, 1997.

Bartoli, A.V., Wegenkittl, R., Konig, A. and Groller, E., "*Nonlinear virtual colon unfolding*", IEEE Proceedings: Visualization, pp. 411-418, 2001.

\* cited by examiner

METHOD AND APPARATUS FOR SYNCHRONIZING CORRESPONDING LANDMARKS AMONG A PLURALITY OF IMAGES

BACKGROUND OF THE INVENTION

The present invention generally relates to a system and method for image processing of multiple images of an object. In particular, the present invention relates to a system and method for synchronizing corresponding landmarks among multiple images of an object.

Medical diagnostic imaging systems encompass a variety of imaging modalities, such as x-ray systems, computerized tomography (CT) systems, ultrasound systems, electron beam tomography (EBT) systems, magnetic resonance (MR) systems, and the like. Medical diagnostic imaging systems generate images of an object, such as a patient, for example, through exposure to an energy source, such as x-rays passing through a patient, for example. The generated images may be used for many purposes. For instance, internal defects in an object may be detected. Additionally, changes in internal structure or alignment may be determined. Fluid flow within an object may also be represented. Furthermore, the image may show the presence or absence of objects in an object. The information gained from medical diagnostic imaging has applications in many fields, including medicine and manufacturing.

One particular application for the information acquired from medical diagnostic imaging is in the diagnosis and treatment of cancer. Although there are many different kinds of cancer, they all share a common cause: an uncontrollable growth of abnormal cells. As most cancer cells grow and accumulate, they form a tumor. Medical diagnostic imaging allows various sections of the human body to be examined for cancerous cells and tumors.

A particular type of medical diagnostic imaging used in detecting cancerous growths is tomographic reconstruction. Tomographic reconstruction reconstructs tomographic images for two-dimensional and three-dimensional image scans. Tomographic reconstruction reconstructs an image from image data projections (such as x-ray projections) generated in an image acquisition system. Data from multiple projections are combined to produce an image representing an object. Often, two-dimensional slices are reconstructed from scans of a three-dimensional object. The two-dimensional slices may be combined to construct a three-dimensional image. These two or three dimensional images may be viewed by a physician, or other health care practitioners, in search of cancerous growths, for example.

However, not all forms of cancerous growths are easily detected using tomographic reconstruction. One such area is that of colorectal cancer. Excluding skin cancers, colorectal cancer is the third most common cancer diagnosed in both men and women in the United States. The American Cancer Society estimates that about 105,500 new cases of colon cancer (49,000 men and 56,500 women) and 42,000 new cases of rectal cancer (23,800 men and 18,200 women) will be diagnosed in 2003. Colorectal cancer is expected to cause about 57,100 deaths (28,300 men and 28,800 women) during 2003.

Colorectal cancers are thought to develop slowly over a period of several years. Most colorectal cancers begin as a polyp, a mass of tissue that grows into the center of the tube that makes up the colon or rectum. Once a cancer forms in these polyps, the cancer may grow into the center of the colon or rectum. The cancerous polyp will also grow into the wall of the colon or rectum where the cancer cells may grow into blood vessels. From these vessels, the cancer cells may then break away, spreading to other parts of the body.

Although colon cancer is the third most common cancer diagnosed and the second largest cause of cancer related death in the United States, it has been estimated that up to ninety percent of colon cancers may be prevented. Colonic polyps develop slowly and may take years before becoming cancerous. If polyps are found early, they may be removed before they develop into cancer, or if they are already cancerous, they may be removed before the cancer spreads. Thus, the one of the keys to preventing colon cancer is screening for potential cancerous polyps. The importance of screening is further magnified because most colonic polyps do not produce any symptoms, and nearly seventy-five percent of people who develop colon cancer have no risk factors for the disease, yielding no warning for the onset of cancer.

The American Cancer Society recommends that every person over the age of fifty be screened for colon cancer. They estimate that if everyone were tested, tens of thousands of lives could be saved each year. However, although colon cancer is the second largest cause of cancer related death, only forty percent of Americans who are at risk for the disease are currently screened as recommended. So few individuals are screened because people typically find the screening methods for colon cancer distasteful. For example, one screening method calls for testing the stool for blood. The blood screening method requires patients to collect stool samples at home to send to the doctor's office for testing. Another screening method, a colonoscopy, involves a bowel cleansing process which lasts about a day, followed by sedation and an examination of the colon with a five-foot-long probe. Due to the time consuming and invasive nature of a colonoscopy, many people choose not to have the colonoscopy.

Tomographic reconstruction of a colon has been advocated as a promising technique for providing mass screening for colorectal cancer. Tomographic reconstruction of a colon is often called a computed tomography colonography (CTC), also called a virtual colonoscopy. A virtual colonoscopy is a technique for detecting colorectal neoplasms by using a computed tomography (CT) scan of a cleansed and air-distended colon. The CTC scan typically involves two CT scans of the colon, a prone scan and a supine scan. A prone scan may include a patient lying face down, for example. Moreover, a supine scan may include a patient lying face up, for example. Both the prone and supine scans capture hundreds of images of a patient's abdomen forming a prone and supine image set. Each image is captured in 20-30 seconds, for example, which translates into an easier, more comfortable examination than is available with other screening tests. Usually, a CTC takes approximately ten minutes, and a person may return to work the same day. Thus, a system and method providing a quick, effective and friendly screening process would be highly desirable. There is a need for a method and system that increases early detection of cancerous polyps and other materials.

However, currently CTC is not a practical clinical tool for colon cancer screening. For CTC to be a practical procedure of screening for colon cancers, a technique should reduce the time for interpreting a large number of images in a time-effective fashion, and for detecting polyps and masses with high accuracy. Currently, however, interpretation of an entire CTC examination is time consuming. A typical CTC examination produces 150-300 axial CT images for each the supine and prone image sets, yielding a total of 300-700 images/patient. Studies show that a case interpretation time per patient is between 15 and 40 minutes even when the reading is done by experts in abdominal imaging. Thus a system and method that reduces CTC case interpretation time would be highly desirable.

In addition, the diagnostic performance of CTC currently remains vulnerable to perceptual errors. Several studies have reported a relatively low sensitivity, 40%-70%, for example, in the detection of polyps using a CTC examination. A low detection rate may result from the system and method used to display and view the images. Thus, an improved system and method used to display and view the images may improve the detection of cancerous growths.

As previously mentioned, a CTC examination involves two scans: a prone scan and a supine scan. Multiple scans may be obtained due to the elastic structure of the colon. That is, the colon is a flexible structure, much like an accordion, that changes shape based on body position. Portions of the colon that are visible in a prone view, may not be visible in a supine view, and vice versa, for example. Thus, in order to have an accurate representation of the colon, both a prone and supine scan should be conducted.

Another reason that performing two scans of the colon provides a more accurate representation than a single scan is that even though pre-exam procedures call for a bowel cleansing process, excess liquid or residual fecal matter within the colon may still be lingering during the exam. Because the excess material has a tendency to shift between a prone image set and a supine image set, target items or potential polyps may be observable in one image set and obscured in the other. Hence, both image sets must be compared and contrasted during a CTC case interpretation.

Often, both the prone and supine image sets are compared and contrasted simultaneously. Ideally, a particular portion of the colon in one set is searched for polyps, and then the corresponding portion of the colon in the second set is also reviewed for polyps. Each potential growth or polyp is scrutinized to determine whether it actually is a polyp or simply excess material. One method to distinguish excess material from a polyp is to compare corresponding locations of the colon in both the prone and supine image sets. Because the excess material tends to shift between a prone and supine image scan, the excess material seen in a particular location in one image set will usually be in a different location in the corresponding image set. However, polyps typically do not change location between the image sets. Thus, if a growth is in a particular location of the colon in both image sets, the growth may be a potential polyp.

Observing a similar growth in corresponding locations of the colon in both the prone and supine image sets facilitates a comparison analysis. Current systems and methods for viewing CTC prone and supine image sets do not link the image sets together. Unlinked images may create difficulty for a user when determining whether or not corresponding locations in the prone and supine image sets are being viewed. Hence, the user currently guesses if the portion of the colon being viewed in the prone image set is the same portion of the colon being viewed in the supine image set.

Guessing whether the portion of the colon being viewed in the prone image set is the same portion of the colon being viewed in the supine image set is very time consuming due to the manual, imprecise nature of the analysis. Forcing a user to guess at colon location accounts for an extremely long CTC case interpretation time per patient. A user spends a significant amount of time ascertaining whether the user is viewing corresponding locations of the colon in each of the prone and supine views. Even if a user thinks the user is viewing two corresponding locations of a colon, currently the user may not be certain. As is explained above, a long CTC case interpretation time currently makes clinical screening impracticable.

Also, rough estimation of corresponding locations provides for a highly inaccurate procedure for distinguishing excess material from potential cancerous growths or other objects. The low detection rate of detecting polyps using a CTC examination mentioned above is partially caused by a user's inability to determine whether the user is viewing corresponding locations of the colon in prone and supine views. As is explained above, the low detection rate currently makes clinical CTC screening impracticable.

Therefore, a need exists for a system and method which synchronizes corresponding locations of an object among multiple images. Such a system and method may be used to synchronize corresponding locations of prone and supine image sets of a CTC examination, for example, thereby reducing CTC case interpretation time and increasing detection rate of potentially cancerous polyps.

BRIEF DESCRIPTION OF THE INVENTION

In one aspect, a method is provided for synchronizing corresponding landmarks among a plurality of images of an elastic object. The method includes identifying a plurality of landmarks in a first image of the object and a second image of the object, determining a correspondence between the landmarks in the first image and the landmarks in the second image, determining a distance transformation between a pair of adjacent landmarks in the first image and the corresponding pair of adjacent landmarks in the second image, and when displaying the first and second images, using the distance transformation to smoothly navigate between the adjacent landmarks such that corresponding landmarks of the first and second images are arrived at about simultaneously during navigation.

In another aspect, a system is provided for synchronizing corresponding landmarks among a plurality of images of an object. The system includes a landmark unit configured to identify a plurality of landmarks in a first image of the object and a second image of the object, determine a correspondence between the landmarks in the first image and the landmarks in the second image, and determine a distance transformation between a pair of adjacent landmarks in the first image and the corresponding pair of adjacent landmarks in the second image. The system also includes an image display unit for displaying the first and second images of the object. The image display unit is configured to smoothly navigate between the adjacent landmarks using the distance transformation such that corresponding landmarks of the first and second images are arrived at about simultaneously during navigation.

In another aspect, a computer readable medium is provided for use by an image processing system. The medium includes instructions directing the system to identify a plurality of landmarks in a first image of the object and a second image of the object, instructions directing the system to determine a correspondence between the landmarks in the first image and the landmarks in the second image, instructions directing the system to determine a distance transformation between a pair of adjacent landmarks in the first image and the corresponding pair of adjacent landmarks in the second image, and instructions directing the system, using the distance transformation, to enable a user, when viewing the first and second images using the system, to smoothly navigate between the adjacent landmarks such that corresponding landmarks of the first and second images are arrived at about simultaneously during navigation.

DETAILED DESCRIPTION OF THE INVENTION

Figure 1:
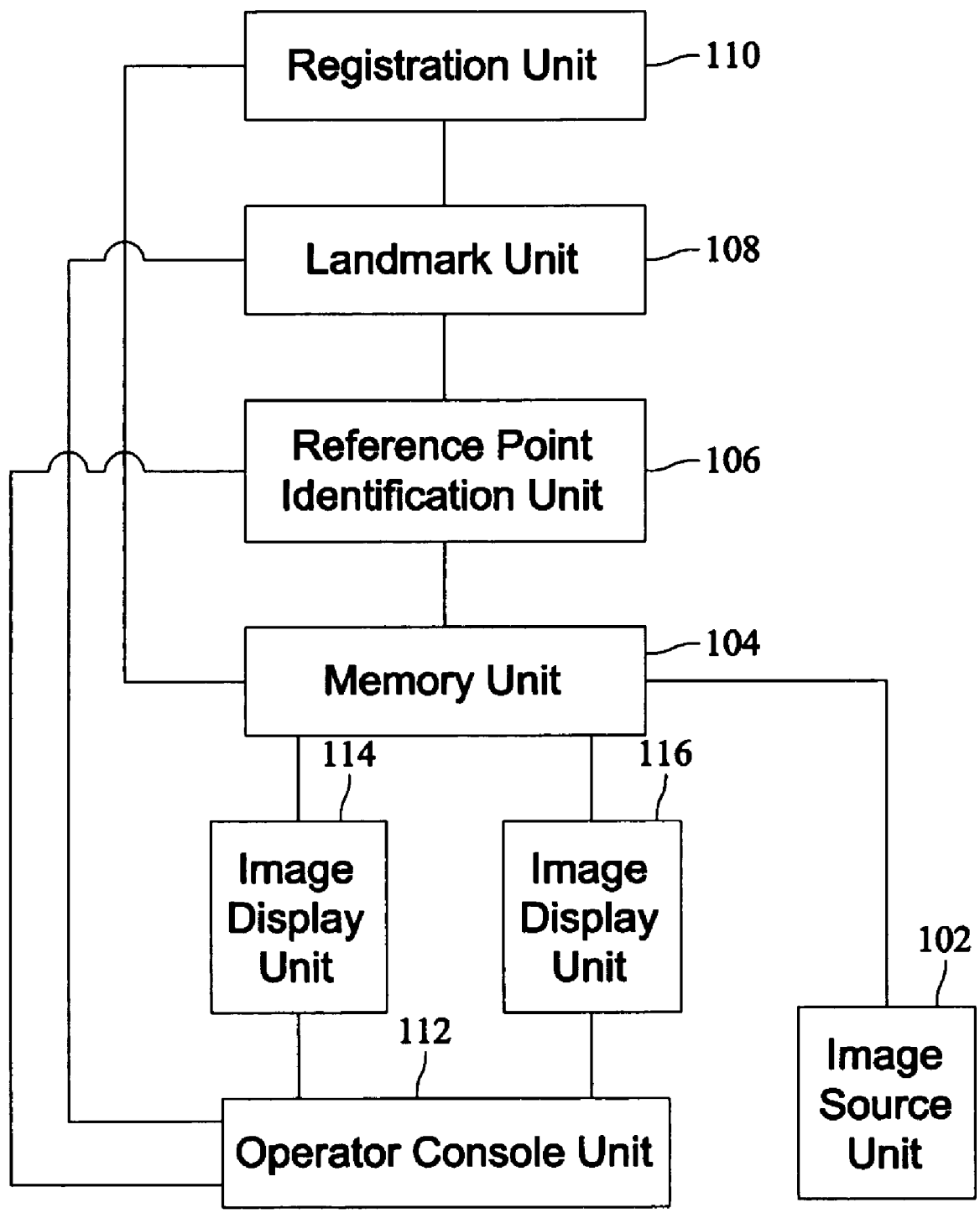
FIG. 1 is a schematic block diagram of an image processing system for synchronizing corresponding landmarks among a plurality of images of an object in accordance with an embodiment of the present invention.

FIG. 1 is a schematic block diagram of an image processing system 100 in accordance with an embodiment of the present invention. The system 100 includes an image source unit 102. The image source unit 102 contains a first image set 103 and a second image set 105 (not shown) of an object, such as, but not limited to, an elastic object. The system 100 also contains a memory unit 104, a reference point identification unit 106, a landmark unit 108, a registration unit 110, an operator console 112, an image display unit 114, and an image display unit 116.

In an embodiment, the system 100 preprocesses image data 103, 105 and then makes the processed image data 103, 105 available for display and navigation by a user. Additionally or alternatively, the image data 103, 105 is available for display prior to being processed by the system 100. The image source unit 102 provides the image data 103, 105 for processing to the memory unit 104. The memory unit 104 stores the image data 103, 105. The memory unit 104 is operatively connected to the reference point identification unit 106, the image display unit 114, the image display unit 116, the registration unit 110, and the image source unit 102. Preprocessed image data 103, 105 is communicated to the reference point identification unit 106. The reference point identification unit 106 performs operations and is operatively connected to the landmark unit 108. The landmark unit 108 performs operations and is operatively connected to the registration unit 110. The registration unit 110 organizes the processed data and communicates with the memory unit 104. The memory unit 104 then communicates the processed image data 103, 105 to the image display units 114, 116. The operator console unit 112 is operatively connected to the image display units 114, 116 and the landmark unit 108. The operator console unit 112 may optionally be operatively connected to the reference point identification unit 106. The operator console unit 112 may contain any suitable control mechanism(s) enabling the unit 112 to function as described herein, such as a ball control, a keyboard, a touch screen, and/or a mouse. Optionally, the operator console unit 112 may be a component of one or both of the image display units 114, 116.

The components of the system 100 may be separate units, may be integrated in various forms, and may be implemented in hardware and/or in software. Moreover, the system 100 may include components that are not described and/or illustrated herein but that perform some or all of the functions of one or more of the components of the system 100 that are described and/or illustrated herein. Each component of the system 100 may include any suitable structure and/or means enabling the component to function as described herein, such as, but not limited to, a processor and/or a memory. Also, multiple image sets may be used. Although FIG. 1 exemplifies an embodiment of the invention that uses two images sets, (a first image set 103 and a second image set 105) the invention itself is not limited to two image sets. Alternatively, multiple images may be taken from a single image set. Moreover, multiple image display units may be used. Although FIG. 1 exemplifies an embodiment of the invention that uses two image display units, embodiments of the invention itself are not limited to two image sets.

Referring again to FIG. 1, the first image set 103 and second image set 105 may be two images or two collections of images, for example, of the same object from different views. For instance, the first image set 103 may contain one or more images of an object in a first position, and the second image set 105 may contain one or more images of an object in a second position. As an example, the object may be lying on a first side, with a second side facing upward, for a first image set 103, for example. During the second image set 105, the object may be turned over so the object is lying on the second side, with the first side facing upward, for example.

The individual images within the image sets 103, 105 may contain the same parameters or different parameters as the other images within the image set. For explanatory purposes only, the image set may be designed to capture the view of an object as one proceeds around the object in a circular fashion. As an example, an image in the image set may be taken every one degree as images are captured in a 360 degree circle around the object. In this example, 360 images would exist in the image set. Embodiments of the invention are not limited to circular pattern image sets, nor are embodiments of the invention limited to one degree increments within an image set or the degree unit as a measuring point. An image set is a set of images, regardless of whether the set contains one image, or many images.

Images and image sets may be obtained from a variety of sources and methods. As an example, images and image sets may be acquired as two, three, or four dimensional images. Two dimensional images include a dual vector plane, three dimensional images include a three vector plane, and four dimensional images include a three vector plane and a time component. The imaging equipment may be directly connected to the system 100 or indirectly connected to the system 100. An example of an indirect connection may be imaging equipment connected to an image storage unit, such as a picture archiving and communications system (PACS), which is connected to the system 100 over a data network. Any method and apparatus capable of generating or delivering the images and image sets may be suitable for use with the system 100.

Once acquired by the system 100, the preprocessed first image set 103 and preprocessed second image set 105 are transmitted to the memory unit 104. The memory unit 104 stores two, three, or four (time) dimensional data as provided by the first image set 103 and second image set 105. The stored image sets 103 and 105 may be sent to the display units 114, 116 for display, or transmitted to the reference point identification unit 106. The reference point identification unit 106 identifies a distinct item of the object, common to all image sets that may be used as a reference point to base calculations upon. In an embodiment, the reference point is a single item that does not deform or change location based upon the object's position. Alternatively, the reference point identification unit 106 may enable a user to manually identify, or select, the reference point using the operator console unit 112.

Once the reference point has been identified, the first image set 103 and second image set 105 are then transmitted to the landmark unit 108. Landmarks are persistent features of an object that may, or may not, change based on the position of the object. The landmark unit 108 enables a user to identify and link the persistent features of the object in both the first image set 103 and the second image set 105 using an automatic and/or a manual process, as will be described below.

Specifically, in some embodiments a user can use the landmark unit 108, via the operator console unit 112, to manually identify one or more landmarks of the object in each of the first and second image sets 103, 105. The user can, via the operator console unit 112, then manually determine a correspondence between the landmarks in the first and second image sets 103, 105. Specifically, each landmark selected in the first image set 103 is linked, or equated, with the corresponding landmark in the second image set 105, and/or vice versa, using the operator console unit 112. For example, the user may select landmarks $A_1$ and $B_1$ in the first image set 103 and landmarks $A_2$ and $B_2$ in the second image set 105. The user can then equate landmark $A_1$ in the first image set 103 with landmark $A_2$ in the second image set 105. Similarly, the user can equate landmark $B_1$ in the first image set 103 with landmark $B_2$ in the second image set 105. The landmarks of each set of corresponding landmarks represent the same structure of the object viewed in different image sets. For example, the second image set 105 may include images of the same object in a different position than in the first image set 103 and/or images of the same object taken at a different time than the first image set 103.

Additionally or alternatively, the landmarks may be identified automatically by the landmark unit 108. Specifically, the landmark unit 108 searches the first image set 103 and the second image set 105 for landmarks. For example, the landmark unit 108 may identify landmarks $A_1$ and $B_1$ in the first image set 103, and landmarks $A_2$ and $B_2$ in the second image set 105. The landmark unit 108 then compares the landmarks of the first image set 103 with the landmarks of the second image set 107 in search of similar landmarks in each set. As landmark unit 108 finds similar landmarks, the landmark unit 108 links, or equates, each landmark in the first image set 103 with the corresponding landmark in the second image set 105, to thereby determine the correspondence between all identified landmarks. For example, as landmarks $A_1$ and $B_1$ in the first image set 103 are identified by the landmark unit 108, the landmark unit 108 searches and locates the corresponding landmarks $A_2$ and $B_2$ in the second image set 105.

The landmark unit 108 may determine a distance of each landmark in each image set from the reference point and/or a distance of each landmark in each image set from adjacent landmarks in the same image set. For example, a distance from the reference point to landmark $A_1$ in the first image set 103 and/or a distance from the reference point to landmark $A_2$ in the second image set 105 may be determined. Additionally, a distance from the reference point to landmark $B_1$ in the first image set 103 and/or the distance from the reference point to landmark $B_2$ in the second image set 105 may be determined. Once the distance information for landmarks A and B from the reference point are known for either or both of the first and second image sets 103, 105, the distance from landmark A to landmark B may also be determined on either or both of the first and second image sets 103, 105.

Once the landmark unit 108 has determined the distances between each adjacent landmark in each image set 103, 105, the landmark unit 108 determines a distance transformation between each pair of adjacent landmarks in the first image set 103 and the corresponding pair of adjacent landmarks in the second image set 105. Specifically, for each pair of adjacent landmarks in the first image set 103 and the corresponding pair of adjacent landmarks in the second image set 105, the landmark unit 108 compares the distance between the pair of adjacent landmarks in the first image set 103 to the distance between the corresponding pair of adjacent landmarks in the second image set 105. For example, the landmark unit 108 may compare the distance between landmarks $A_1$ and $B_1$ in the first image set 103 to the distance between the landmarks $A_2$ and $B_2$ in the second image set 105. Based on the comparison, and for each pair of adjacent landmarks in the first image set 103 and the corresponding pair of adjacent landmarks in the second image set 105, a distance transformation can be determined that establishes different rates for traveling along the corresponding distances during viewing of the image sets 103, 105 such that the different corresponding distances take about the same time to traverse. In other words, the distance transformation establishes the rate at which the image display unit 114 must navigate the distance between a pair of adjacent landmarks in the first image set 103 and a different rate at which the image display unit 116 must navigate the distance between the corresponding pair of adjacent landmarks in the second image set 105 such that the navigation between the pair of adjacent landmarks in the first image set 103 takes about the same time as the navigation between the corresponding pair of adjacent landmarks in the second image set 105. The travel time between a pair of adjacent landmarks in the first image set 103 is therefore approximately equal to the travel time between the corresponding pair of adjacent landmarks in the second image set 105. Adjacent landmarks in the first image set 103 are therefore time-synchronized with the corresponding adjacent landmarks in the second image set 105. Accordingly, the determined distance transformations can be used to facilitate smoothly navigating between landmarks when viewing the first and second image sets 103, 105, for example during a "fly through" of the object. Specifically, as the user sequentially navigates through the landmarks of each of the image sets 103, 105, corresponding landmarks of the image sets 103, 105 are arrived at about simultaneously.

The landmarks from each image set 103, 105, the determined correspondence between the landmarks in the first and second image sets 103, 105, and each determined distance transformation may be stored in the memory 108. In some embodiments, the landmarks from each image set 103, 105, the determined correspondence between the landmarks in the first and second image sets 103, 105, and each determined distance transformation are transferred to the registration unit 110 for organization and/or recording, prior to being transferred to the memory unit 104 for storage.

In an embodiment, once the memory unit 104 has stored the processed image data 103, 105 as received from the registration unit 110 or the landmark unit 108, the processed image data 103, 105 is available for display and navigation. As explained above, the image data may be available for display prior to processing. For example, images may be displayed on display units 114, 116 and be refreshed as image data 103, 105 is processed in the system 100. Display of the image data 103, 105 may consist of a whole or partial two, three, or four dimensional display of the object. Moreover, the number of image sets to be displayed does not control the number of display units. Any combination of display units and image sets may be used to implement the invention. The combination in FIG. 1 is only an example.

Referring to FIG. 1, a user or computer program may direct the display of image set 103 on image display unit 114 and display of image set 105 on image display unit 116. The image displayed on image display unit 116 from image set 105 corresponds to the image as displayed on image display unit 114 from image set 103. Both displays allow the user to view the same location of the object in two different image sets. Navigation of the image data 103, 105 may involve static and/or dynamic images in two dimensional, three dimensional, and/or four dimensional views. The operator console unit 112 may also allow a "fly through" of the object. During fly through, partial views of the object are viewed in quick succession to create a video of the images within an image set 103, 105.

The image display units 114, 116 are configured to smoothly navigate between adjacent landmarks in each of the image sets 103, 105. Specifically, as the user sequentially navigates through the landmarks of each of the image sets 103, 105, for example during a "fly through" of the object, corresponding landmarks of the image sets 103, 105 are arrived at about simultaneously. The smooth navigation is made possible by the determined distance transformations between each pair of adjacent landmarks on the first image set 103 and the corresponding pairs of adjacent landmarks on the second image set 105. Specifically, based on the determined distance transformations, the image display units 114, 116 adjust a rate at which the image display unit (e.g., unit 114) navigates the distance to the next landmark of its image set (e.g., image set 103) relative to the rate at which the other image display unit (e.g. unit 116) navigates the distance to the corresponding landmark of the other image set (e.g. image set 105). In other words, the travel time between a pair of adjacent landmarks in one of the image sets (e.g., the image set 103) is approximately equal to the travel time between the corresponding pair of adjacent landmarks in the other image set (e.g., the image set 105). Accordingly, in some embodiments, the determined distance transformations time-synchronize adjacent landmarks in one of the image sets (e.g., the image set 103) with the corresponding adjacent landmarks in the other image set (e.g., the image set 105).

As an example, the system 100 may be used in conducting a computed tomography colonography (CTC) to detect colon cancer. In a CTC, a computed tomography (CT) machine is used to acquire images of the human colon. Two sets of images are acquired, a prone set of images and a supine set of images. A computed tomography machine used to acquire the images may be a local machine or a machine connected to a network in which images may be stored or retrieved. The images are generally two, three, or four dimensional images at acquisition.

Figure 2:
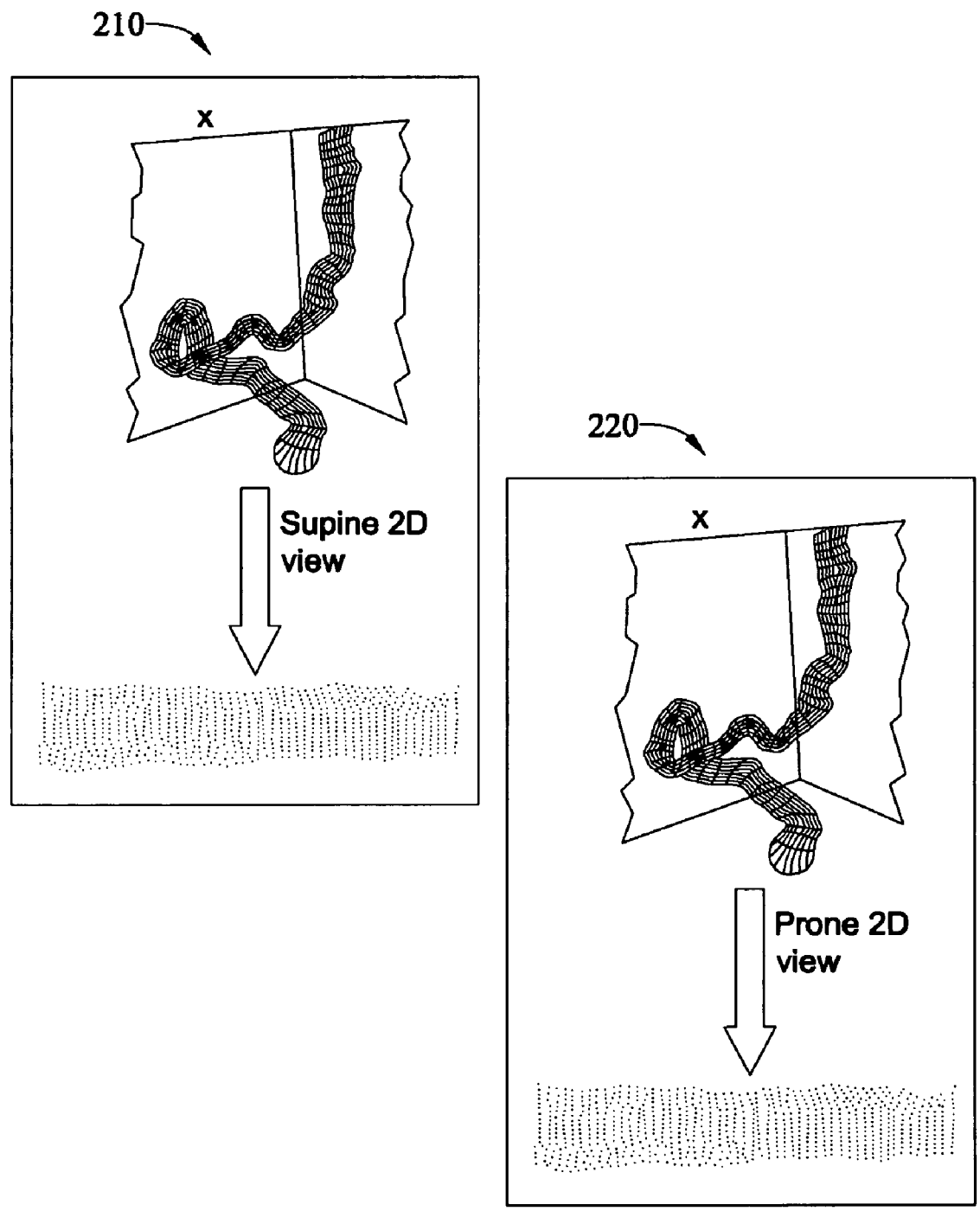
FIG. 2 is a graphic representation of data used in accordance with an embodiment of the present invention.

FIG. 2 shows a prone and a supine representation of a human colon in accordance with an embodiment of the present invention. A supine image set 210 shows a typical three dimensional and a typical two dimensional representation of a colon from a CT supine scan. A prone image set 220 shows a typical three dimensional and a typical two dimensional representation of a colon from a CT prone scan. The representations are created using multiple images in each image set.

Figure 4:
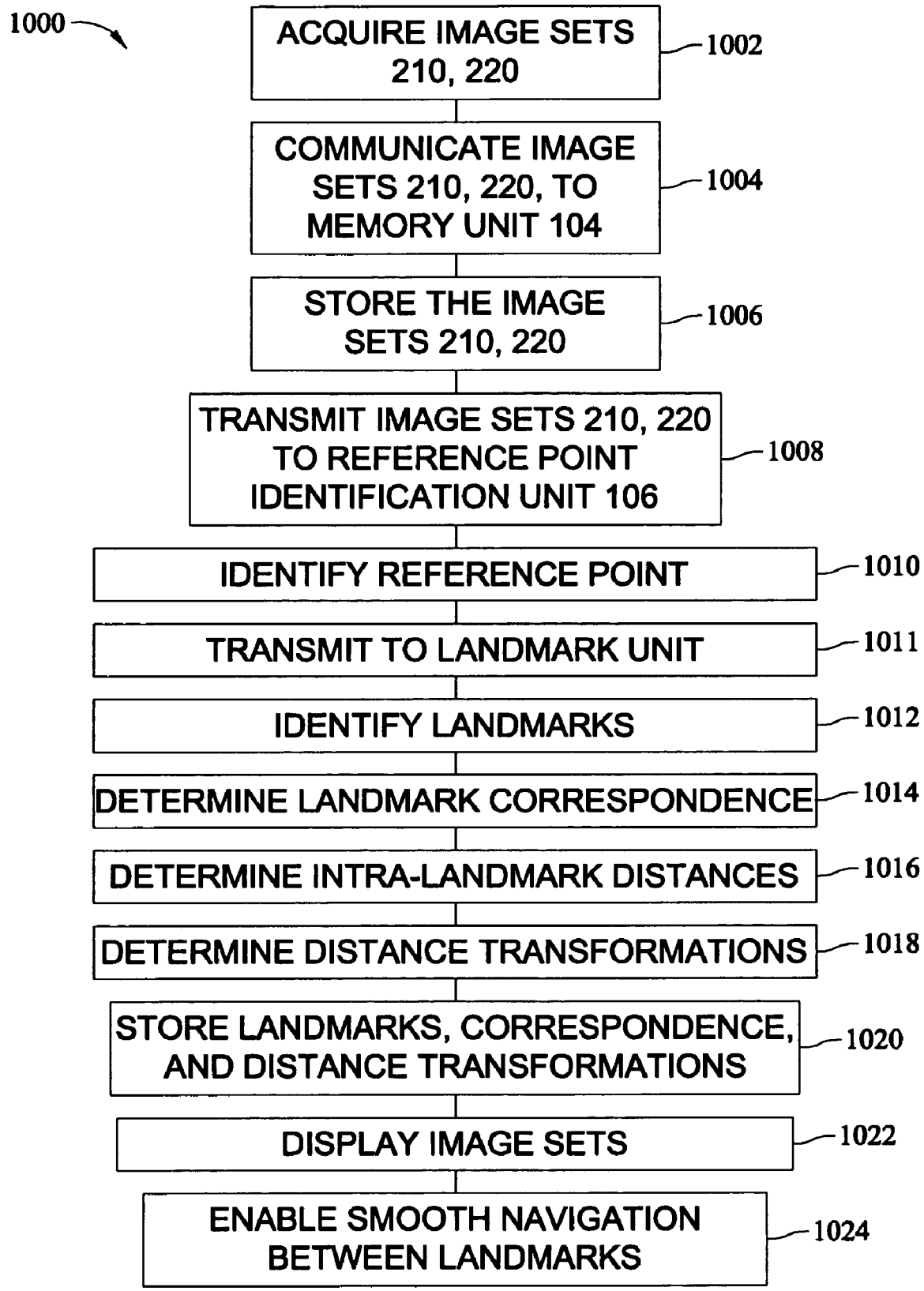
FIG. 4 is a flow chart illustrating a method for synchronizing corresponding landmarks among a plurality of images of an object in accordance with an embodiment of the present invention.

FIG. 4 is a flow chart illustrating a method 1000 for synchronizing corresponding landmarks among the supine image set 210 and the prone image set 220 in accordance with an embodiment of the present invention. Referring to FIGS. 1, 2, and 4, the first image set 103 may be referred to as the supine image set 210 and the second image set 105 may be referred to as the prone image set 220, for example. In an embodiment, the supine image set 210 and the prone image set 220 are acquired 1002 by the image source unit 102 and communicated 1004 to the memory unit 104. The memory unit 104 stores 1006 the supine and prone image sets 210, 220. The supine image set 210 and the prone image set 220 are then transmitted 1008 to the reference point identification unit 106. As previously mentioned, the reference point identification unit 106 is used, whether manually or automatically, to identify 1010 a reference point for calculation purposes. In an embodiment, the reference point is a human anus. The anus is an anatomically distinct object that does not substantially deform during transitions between prone and supine views. Hence, the location of the anus should be the same in the prone image set 220 as it is in the supine image set 210, making the location of the anus a usable reference point to conduct calculations in both the prone image set 220 and supine image set 210.

Figure 3:
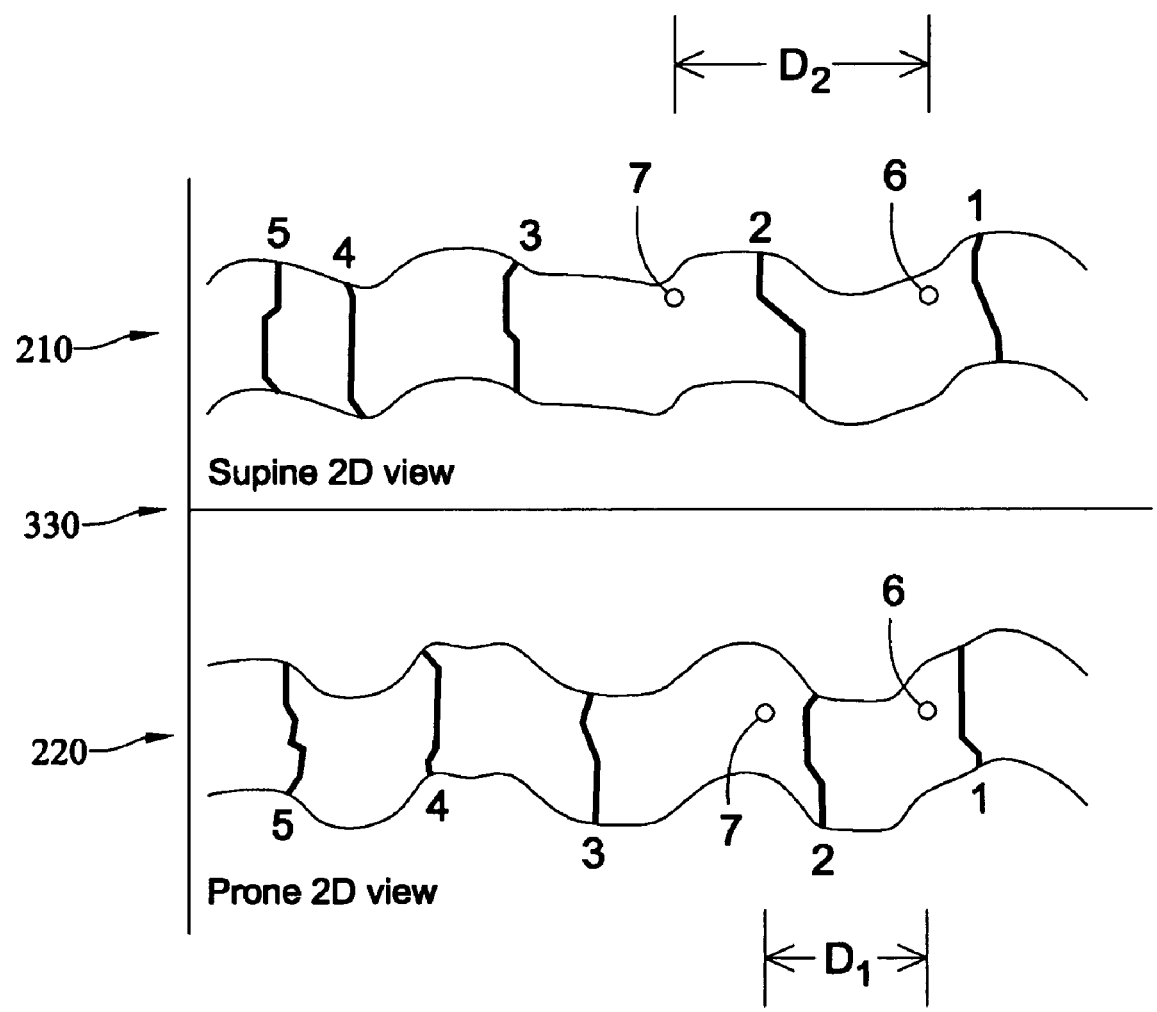
FIG. 3 illustrates an exemplary correspondence of landmarks among supine and prone views of an object in accordance with an embodiment of the present invention.

The prone and supine image sets 220, 210, respectively, are then transmitted 1011 to the landmark unit 108. A plurality of landmarks in the prone image set 220 and the supine image set 210 are then manually or automatically identified 1012. As explained above, landmarks are persistent features of an object, regardless of the object's position. In an embodiment, the landmarks are folds or polyps of the colon, for example. Even though the colon may change position from the prone to supine views, the folds of the colon generally remain recognizable from the prone to supine views. In some embodiments, some or all of the identified 1012 landmarks may be landmarks that are of diagnostic value, such as, but not limited to, a polyp. FIG. 3 illustrates an example of the landmarks which may be identified 1012, whether manually and/or automatically, in accordance with an embodiment of the present invention. The supine image set 210 shows landmarks 1, 2, 3, 4, 5, 6, and 7. The prone image set 220 shows corresponding landmarks 1, 2, 3, 4, 5, 6, and 7, which represent the same structure of the colon as landmarks 1-7 on the supine image set 210, respectively. The reference point 330 is also shown. The landmarks 1, 2, 3, 4, and 5 represent various folds of a colon. The landmarks 6 and 7 represent various polyps of the colon. The reference point 330 represents an anus, for example.

Once the landmarks in the supine image set 210 and the prone image set 220 are identified 1012, whether manually and/or automatically, correspondence between the landmarks of the supine image set 210 and the prone image set 220 is then determined 1014. As discussed above, the correspondence may be determined 1014 manually by a user and/or automatically by the landmark unit 108. Corresponding landmarks may not be located the same distance from the reference point 330 in each image set 210, 220. Non-uniform stretching of the colon from the prone and supine positions is demonstrated in FIG. 3. Even though landmarks 3, 4, 5, and 7 of each image set 210, 220 are generally the same structure of the same object, landmarks 3, 4, 5, and 7 of the prone set 220 are different distances from the reference point 330 than landmarks 3, 4, 5, and 7 of the supine image set 210. In FIG. 3, a difference between the distance $D_1$ between landmarks 6 and 7 on the prone image set 220 and the distance $D_2$ between landmarks 6 and 7 on the supine image set 210 highlights non-uniformity of distance of an elastic object such as the colon.

Using the reference point 330, the landmark unit 108 then determines 1016 a distance of each landmark in the prone image set 220 from each adjacent landmark in the prone image set 220, and determines 1016 a distance of each landmark in the supine image set 210 from each adjacent landmark in the supine image set 210. For example, and referring to FIG. 3, the landmark unit 108 may measure the distance $D_1$ between landmarks 6 and 7 on the prone image set 220 and may measure the distance $D_2$ between landmarks 6 and 7 on the supine image set 210. The landmark unit 108 then determines 1018 a distance transformation between each pair of adjacent landmarks in the supine image set 210 and the corresponding pair of adjacent landmarks in the prone image set 220. Specifically, for each pair of adjacent landmarks in the supine image set 210 and the corresponding pair of adjacent landmarks in the prone image set 220, the landmark unit 108 compares the distance between the pair of adjacent landmarks in the supine image set 210 to the distance between the corresponding pair of adjacent landmarks in the prone image set 220. For example, the landmark unit 108 may compare the distance $D_1$ between landmarks 6 and 7 in the prone image set 220 with the distance $D_2$ between the landmarks 6 and 7 in the supine image set 210. Based on the comparison, and for each pair of adjacent landmarks in the supine image set 210 and the corresponding pair of adjacent landmarks in the prone image set 220, a distance transformation can be determined 1016 that establishes different rates for traveling along the corresponding distances during viewing of the image sets 210, 220 such that the different corresponding distances take about the same time to traverse. In other words, the distance transformations time-synchronize adjacent landmarks in the supine image set 210 with the corresponding adjacent landmarks in the prone image set 220 such that the travel time between a pair of adjacent landmarks in the supine image set 210 is approximately equal to the travel time between the corresponding pair of adjacent landmarks in the prone image set 220. For example, the distance transformation establishes the rate at which the image display unit 114 must navigate the distance between a pair of adjacent landmarks in the first supine image set 210 and a different rate at which the image display unit 116 must navigate the distance between the corresponding pair of adjacent landmarks in the prone image set 105 such that the navigation between the pair of adjacent landmarks in the supine image set 210 takes about the same time as the navigation between the corresponding pair of adjacent landmarks in the prone image set 220. Accordingly, the determined 1016 distance transformations can be used to facilitate smoothly navigating between landmarks when viewing the supine and prone image sets 210, 220, respectively. Specifically, as the user sequentially navigates through the landmarks of each of the image sets 210, 220, for example during a "fly through" of the object, corresponding landmarks of the image sets 210, 220 are arrived at about simultaneously.

The landmarks from each image set 210, 220, the determined correspondence between the landmarks in the prone and supine image sets 220, 210, respectively, and each determined distance transformation may then be stored 1020 in the memory 108. In some embodiments, the landmarks from each image set 220, 210, the determined correspondence between the landmarks in the image sets 220, 210, and each determined distance transformation are transferred to the registration unit 110 for organization and/or recording, prior to being transferred to the memory unit 104 for storage.

Once the memory unit 104 has stored 1020 the processed image sets 220, 210 as received from the registration unit 110 or the landmark unit 108, the processed image sets 220, 210 are displayed 1022. For example, the supine image set 210 is displayed 1022 on the image display unit 114 and the prone image set 220 is displayed 1022 on the image display unit 116. Display 1022 of the image sets 220, 210 may consist of a whole or partial two, three, or four dimensional display of the colon. Both the image display unit 114 and the image display unit 116 display the same portion of the colon. Alternatively, the image display unit 114 may display the prone image set 220, and the image display unit 116 may display the supine image set 210 of the colon, for example. Alternatively, as mentioned above, both the prone and supine image sets 220, 210, respectively, may be displayed on a single display unit.

When displaying the image sets 220, 210, the image display units 114, 116 uses the determined distance transformations to enable 1024 smooth navigation between landmarks on each image set 220, 210. Specifically, based on the determined distance transformations, the image display units 114, 116 adjust a rate at which the image display unit 114 navigates the distance to the next landmark of the supine image set 210 relative to the rate at which the image-display unit 116 navigates the distance to the corresponding landmark of the prone image set 220. Accordingly, when viewing the image sets 220, 210, a user can smoothly navigate 1024 between some or all of the landmarks 1-7 in each of the prone and supine image sets 220, 210, respectively. Specifically, and for example, as the user sequentially navigates through the landmarks of each of the image sets 210, 220, corresponding landmarks of the image sets 210, 220 are arrived at about simultaneously.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for synchronizing corresponding landmarks among a plurality of images of an elastic object, said method comprising:
    identifying a plurality of landmarks in a first image of the object and a second image of the object;
    determining a correspondence between the landmarks in the first image and the landmarks in the second image;
    determining a first rate for navigating between a pair of adjacent landmarks in the first image and determining a second rate for navigating between the corresponding pair of adjacent landmarks in the second image, using a computer, wherein the first rate is different than the second rate; and
    when displaying the first and second images, using the first and second rates to smoothly navigate between the adjacent landmarks such that corresponding landmarks of the first and second images are arrived at about simultaneously during navigation.

2. The method of claim 1, further comprising identifying a first reference point in the first image of the object and a second reference point in the second image of the object, the first reference point corresponding to the second reference point.

3. The method of claim 1, wherein determining first rate for navigating between a pair of adjacent landmarks in the first image and determining a second rate for navigating between the corresponding pair of adjacent landmarks in the second image comprises:
    determining a first distance between the pair of adjacent landmarks in the first image;
    determining a second distance between the corresponding pair of adjacent landmarks in the second image; and
    comparing the first and second distances to obtain the distance transformation.

4. The method of claim 1, wherein identifying a plurality of landmarks in the first and second images of the object comprises identifying a polyp as a landmark.

5. The method of claim 1, wherein the first and second images of the object are at least one of two-dimensional views, three-dimensional views, and four-dimensional views.

6. The method of claim 1, wherein the object is the colon of a human body, and the first and second images are computerized tomography scans, the first image being a prone scan of the human body and the second image being a supine scan of the human body.

7. The method of claim 1, wherein using the first and second rates to smoothly navigate between the adjacent landmarks comprises traveling between the pair of adjacent landmarks in the first image for a first travel time and traveling between the corresponding pair of adjacent landmarks in the second image for a second travel time that is approximately the same as the first travel time.

8. A system for synchronizing corresponding landmarks among a plurality of images of an object, said system comprising:
   a landmark unit configured to:
      identify a plurality of landmarks in a first image of the object and a second image of the object;
      determine a correspondence between the landmarks in the first image and the landmarks in the second image; and
      determine a first rate for navigating between a pair of adjacent landmarks in the first image and determine a second rate for navigating between the corresponding pair of adjacent landmarks in the second image, wherein the first rate is different than the second rate; and
   an image display unit for displaying the first and second images of the object, the image display unit configured to smoothly navigate between the adjacent landmarks using the first and second rates such that corresponding landmarks of the first and second images are arrived at about simultaneously during navigation.

9. The system method of claim 8, further comprising a reference point identification unit configured to identify a first reference point in the first image of the object and a second reference point in the second image of the object, the first reference point corresponding to the second reference point.

10. The system of claim 8, wherein the landmark unit is configured to determine the first and second rates by:
    determining a first distance between the pair of adjacent landmarks in the first image;
    determining a second distance between the corresponding pair of adjacent landmarks in the second image; and
    comparing the first and second distances to obtain the first and second rates.

11. The system of claim 8, wherein the first and second images of the object are at least one of two-dimensional views, three-dimensional views, and four-dimensional views.

12. The system of claim 8, wherein the object is the colon of a human body, and the first and second images are computerized tomography scans, the first image being a prone scan of the human body and the second image being a supine scan of the human body.

13. The system of claim 8, further comprising an operator console unit operatively connected to the landmark unit and the image display unit.

14. The system of claim 8, wherein the image display unit is configured to smoothly navigate between the adjacent landmarks by traveling between the pair of adjacent landmarks in the first image for a first travel time and traveling between the corresponding pair of adjacent landmarks in the second image for a second travel time that is approximately the same as the first travel time.

15. A tangible and non-transitory computer readable medium for use by an image processing system, the medium comprising:
    instructions directing the system to identify a plurality of landmarks in a first image of the object and a second image of the object;
    instructions directing the system to determine a correspondence between the landmarks in the first image and the landmarks in the second image;
    instructions directing the system to determine a first rate for navigating between a pair of adjacent landmarks in the first image and determine a second rate for navigating between the corresponding pair of adjacent landmarks in the second image wherein the first rate is different than the second rate; and
    instructions directing the system, using the first and second rates, to enable a user, when viewing the first and second images using the system, to smoothly navigate between the adjacent landmarks such that corresponding landmarks of the first and second images are arrived at about simultaneously during navigation.

16. The medium of claim 15, wherein the instructions directing the system to use the first and second rates, to enable a user, when viewing the first and second images using the system, to smoothly navigate between the adjacent landmarks comprises directing the system to travel between the pair of adjacent landmarks in the first image for a first travel time and to travel between the corresponding pair of adjacent landmarks in the second image for a second travel time that is approximately the same as the first travel time.

* * * * *